Patented Oct. 17, 1922.

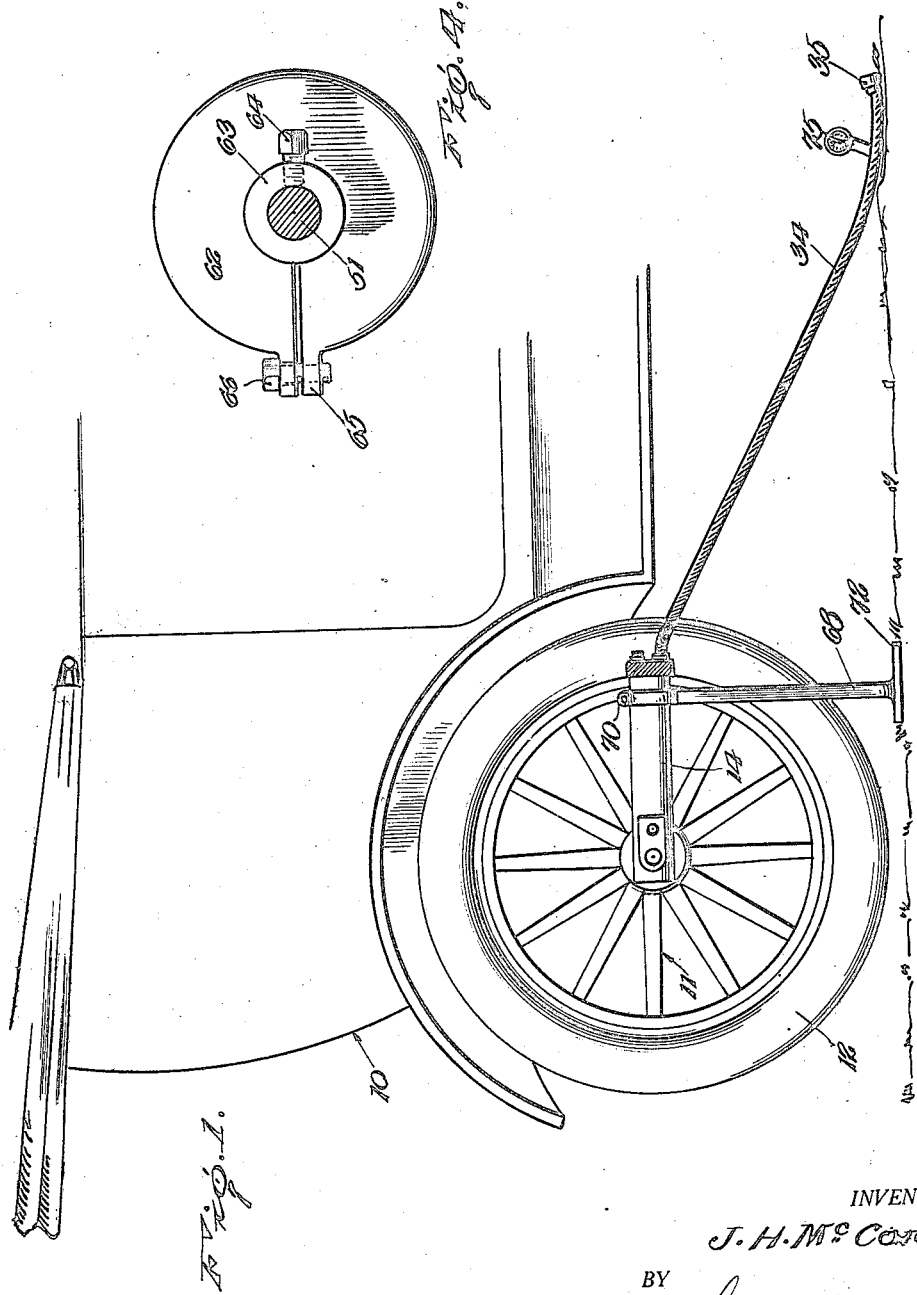

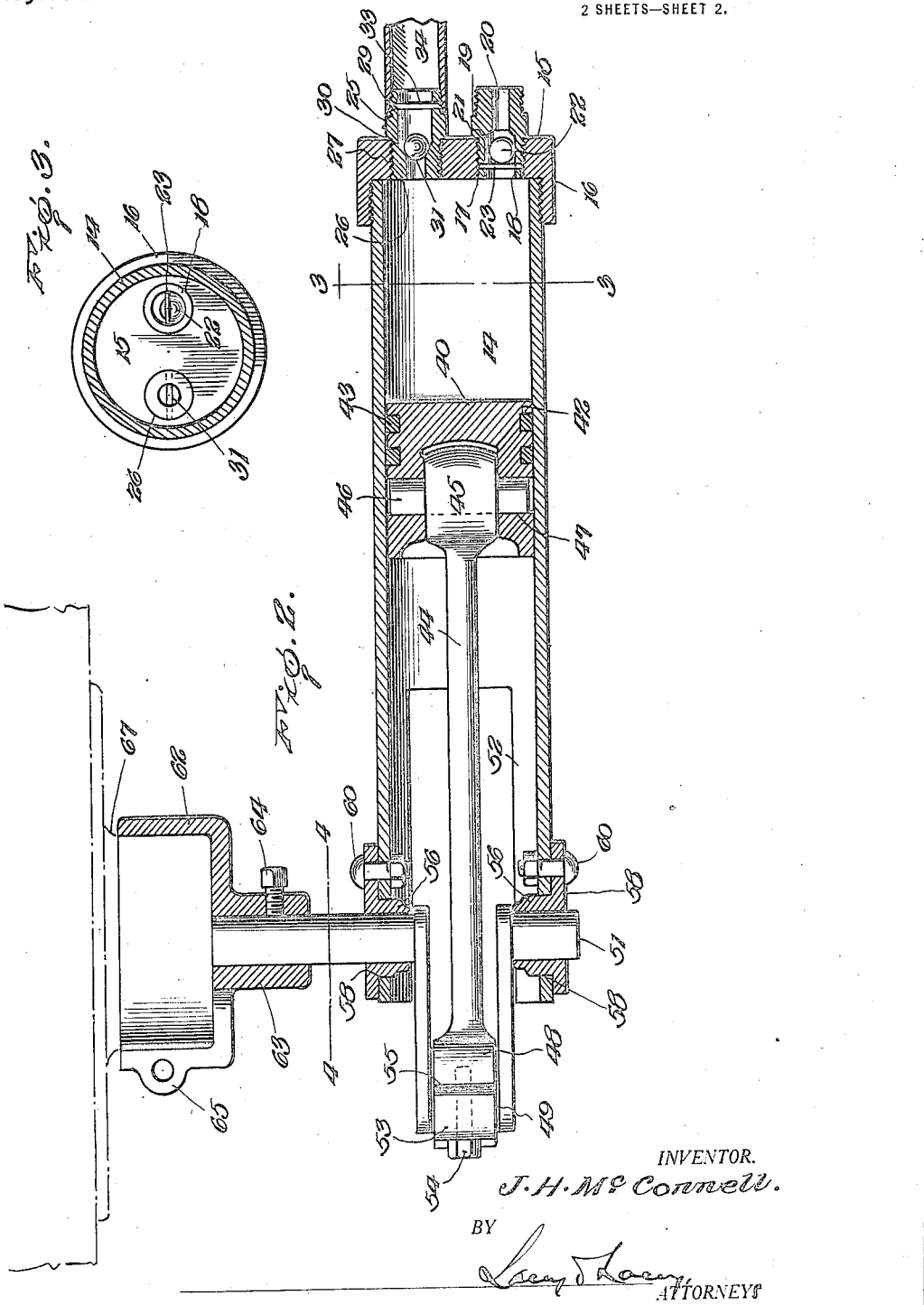

1,432,196

UNITED STATES PATENT OFFICE.

JOHN H. McCONNELL, OF RED LION, PENNSYLVANIA.

TIRE PUMP.

Application filed April 5, 1920. Serial No. 371,306.

*To all whom it may concern:*

Be it known that I, JOHN H. MCCONNELL, a citizen of the United States, residing at Red Lion, in the county of York and State of Pennsylvania, have invented certain new and useful Improvements in Tire Pumps, of which the following is a specification.

This invention relates to improvements in tire pumps especially adapted for use in connection with motor vehicles.

An important object of this invention is to provide a tire pump which may be readily applied or connected to the hub of one of the rear wheels of a motor vehicle so that the power of the rear wheel may be utilized for operating the tire pump.

A further object of the invention is to provide a tire pump for motor vehicles which may be compactly folded so that the same may be carried in one of the compartments of a motor vehicle.

A further object of the invention is to provide a tire pump for the pneumatic tires of motor vehicles which may be connected to the hub of one of the power wheels of the vehicle without in any way altering the construction of the vehicle or removing any of the parts of the same.

The invention further aims to provide a pump of the class described which is efficient, desirable in use and cheap to manufacture.

Other objects and advantages of the invention will be apparent during the course of the following description.

In the accompanying drawings forming a part of this application and in which like numerals are employed to designate like parts throughout the same, Figure 1 is a fragmentary side elevation of a motor vehicle having the improved tire pump applied thereto, Figure 2 is a horizontal section through the improved pump, Figure 3 is a vertical transverse section taken on line 3—3 of Figure 2, Figure 4 is a vertical transverse section taken on line 4—4 of Figure 2.

In the drawings wherein for the purpose of illustration is shown a preferred embodiment of the invention, the numeral 10 generally designates a motor vehicle having rear wheels 11 which carry pneumatic tires 12.

As is well known the rear wheels have connection with a source of power such as an internal combustion engine and are rotated by the same for imparting motion to the vehicle.

The pump forming the subject matter of this application comprises a cylinder 14 having a head 15 threaded on its forward end through the medium of an interiorly screw threaded annular flange 16. As particularly illustrated in Figure 2, the head 15 is provided with an interiorly screw threaded opening 17 which receives the attaching portion 18 of a valve casing 19. The valve casing is provided with a longitudinal bore 20 enlarged at the inner end portion to form a conical valve seat 21 adapted to be engaged by a ball valve 22. A pin 23 is extended across the enlarged portion of the bore 20 and serves as a means whereby the ball valve may be confined within the enlarged portion of the bore. The pin 23 has its end portions received within aligned openings in the attaching portions 18 of the casing and may be positioned after the arrangement of the valve within the casing. An exhaust valve casing 25 is provided with a threaded attaching portion 26 adapted to be threaded into an interiorly screw threaded opening 27 in the cylinder head 15. The valve casing 25 is provided with a longitudinally extending bore 29 which is reduced at one end portion for forming a conical valve seat 30 adapted to be engaged by a ball valve 31 movable within the bore. The ball valve 31 is confined within the bore 29 by a transversely extending retaining pin 33 similar in construction and arrangement to the transversely extending retaining pin 23. The outer portion of the valve casing 25 is exteriorly screw threaded for engagement with a hose 34 having its forward portion provided with a coupling 35 adapted to be engaged with the nipple of the inflating valve of one of the tires of the vehicle.

With reference to Figure 2, it will be noted that a piston 40 is movable within the cylinder for drawing a charge of air through the inlet valve and discharging the same through the valve casing 25 into the hose 34. As the piston moves inwardly a suction is created within the cylinder which moves the spherical valve 22 from its seat so that air is drawn into the cylinder. On the outward movement of the piston the spherical valve 22 is, of course, seated and the spherical valve 31 is unseated whereby the air is forced through the valve casing 25 to the tire being inflated. By this construction the valves of the pump are automatic in their operation. The piston is provided with a plurality of annular grooves 42 which receive packing rings 43 adapted for providing an air tight connection between the piston and the side walls of the cylinder.

The mechanism for reciprocating the piston comprises a piston rod 44 having its forward portion provided with a sleeve 45 disposed within the piston and receiving a wrist pin 46 which, as illustrated in Figure 2, has its end portions extended through alined openings 47 in the piston. The rear portion of the piston rod 44 is provided with a bearing 48 connected to the crank 49 of a crank shaft 51. During the rotation of the crank shaft the crank of the same and the adjacent portion of the piston rod are moved through elongated slots 52 opening out through the rear end of the cylinder and disposed in opposite sides of the same. By providing the elongated slots 52 in opposite sides of the cylinder at the rear portion of the same, the stroke of the piston is materially increased for increasing the working capacity of the pump. The bearing 48 is of the two-part type and is therefore provided with a cap 53 detachably secured to the other section of the bearing by cap screws 54. A suitable number of shims 55 may be provided between the cap 53 and the major portion of the bearing for adjusting the frictional contact between the crank and the bearing.

The shaft 51 comprises a pair of longitudinally aligned sections rotatably extended through bushings 56 arranged within aligned openings 58 in opposite sides of the cylinder. The bushings 56 are provided with laterally projecting flanges 59 rigidly secured flatly in contact with the outer sides of the cylinder by bolts 60.

The crank shaft is detachably connected to an attaching collar 62 having its outer side provided with a sleeve 63 receiving one end portion of the crank shaft. A set screw 64 carried by the sleeve 63 may be engaged with the crank shaft for securely connecting the same to the sleeve. As illustrated in Figure 4, the collar 62 is split and is provided at its adjacent ends with a pair of apertured ears 65 which receive a fastening bolt 66 adapted for drawing the collar 62 tightly into engagement with the hub cap 67.

As illustrated in Figure 1, the pump is adapted to be arranged horizontally at one side of the power wheel 11 and is supported in a horizontal position by a standard 68 pivoted at its upper end to a split band 70 surrounding the cylinder 14. When it is desired to fold the pump preparatory to packing the same in one of the compartments of the vehicle, the standard may be swung along one side of the cylinder for occupying a minimum of space. It will be noted that the base 72 of the standard extends beyond the rear end of the pump when the standard is swung along the side of the pump.

When it is desired to inflate one of the pneumatic tires of the vehicle, the collar 62 carried by the crank shaft may be detachably connected to the hub cap of one of the driving wheels and the base 72 of the standard engaged with the ground so as to support the pump in a horizontal position. Upon jacking the driving wheel of the vehicle from the ground, the engine of the vehicle may be started for rotating the driving wheel. As the wheel rotates the crank shaft 51 also rotates for imparting a reciprocatory motion to the piston. The movement of the piston within the cylinder draws a quantity of air into the cylinder and subsequently supplies the same to the tube 34.

If desired, a suitable pressure gage 75 may be located in the tube 34 for indicating the pressure of air within the tire without releasing the coupling from the nipple of the inflating valve.

From the foregoing it will be apparent that a pump constructed in accordance with this invention may be readily attached to one of the driving wheels of a vehicle without altering the construction of the vehicle and without inconvenience on the part of the operator.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

A tire pump for motor vehicles comprising a cylinder open from end to end and having walls of uniform thickness throughout, a head having an annular flange threaded interiorly to engage one end of said cylinder, said head being provided with valved inlet and outlet ports, a rigid support removably secured on said end, a piston slidably arranged in said cylinder and having a hinged rod, a crank shaft connected with said piston rod, bearing blocks for said shaft projecting inwardly to provide axial abutments against the crank portion of said shaft, said bearing blocks having flanges, and means for detachably securing the flanges to the walls at the other end of said cylinder, the crank of said shaft being longer than the radius of said cylinder, suitable side openings being provided at said other end of the cylinder to permit swinging of said crank, one end of the crank shaft being extended exteriorly of its bearing block, a sleeve secured upon the extended end of the crank shaft, said sleeve being provided with a split muff adapted to receive the hub of a driving wheel, and means for tightening said muff about said hub, the crank shaft being in axial alignment with said hub, and said hub supporting said other end of the cylinder through the intermediary of said sleeve and said crank shaft.

In testimony whereof I affix my signature.

JOHN H. McCONNELL. [L. S.]